United States Patent [19]
Chang

[11] Patent Number: 5,298,919
[45] Date of Patent: Mar. 29, 1994

[54] MULTI-DIMENSIONAL INPUT DEVICE
[75] Inventor: Mingtai Chang, Harvard, Mass.
[73] Assignee: Multipoint Technology Corporation, Westford, Mass.
[21] Appl. No.: 922,804
[22] Filed: Jul. 31, 1992

Related U.S. Application Data

[63] Continuation-in-part of Ser. No. 739,833, Aug. 2, 1991, abandoned.
[51] Int. Cl.$^5$ .............................................. G06F 3/02
[52] U.S. Cl. .................................. 345/163; 345/167; 74/471 XY
[58] Field of Search ............... 340/706, 709, 710, 721; 74/471 XY

[56] References Cited

U.S. PATENT DOCUMENTS

| | | | |
|---|---|---|---|
| 4,562,347 | 12/1985 | Hovey et al. | 250/221 |
| 4,578,674 | 3/1986 | Baker et al. | 340/710 |
| 4,638,199 | 1/1987 | Blesser et al. | 178/19 |
| 4,685,070 | 8/1987 | Flinchbaugh | 364/522 |
| 4,692,878 | 9/1987 | Ciongoli | 364/518 |
| 4,719,455 | 1/1988 | Louis | 340/709 |
| 4,748,441 | 5/1988 | Brzezinski | 340/709 |
| 4,763,100 | 8/1988 | Wood | 338/128 |
| 4,763,116 | 8/1988 | Eichholz | 340/710 |
| 4,766,423 | 8/1988 | Ono et al. | 340/709 |
| 4,782,327 | 11/1988 | Kley et al. | 340/365 P |
| 4,786,892 | 11/1988 | Kubo et al. | 340/365 |
| 4,787,051 | 11/1988 | Olson | 364/518 |
| 4,791,581 | 12/1988 | Ohba | 364/521 |
| 4,796,201 | 1/1989 | Wake | 364/518 |
| 4,812,829 | 3/1989 | Ebina | 340/709 |
| 4,835,528 | 5/1989 | Flinchbaugh | 340/709 |
| 4,839,838 | 6/1989 | LaBiche | 364/709 |
| 4,862,152 | 8/1989 | Milner | 340/712 |
| 4,875,033 | 10/1989 | Kato et al. | 340/706 |
| 4,885,433 | 12/1989 | Schier | 178/19 |
| 4,885,702 | 12/1989 | Ohba | 364/521 |
| 4,886,941 | 12/1989 | Davis et al. | 178/18 |
| 4,887,230 | 12/1989 | Noguchi et al. | 340/710 |
| 4,891,632 | 1/1990 | Chang | 340/710 |
| 4,901,250 | 2/1990 | Ishida | 364/521 |
| 4,911,527 | 3/1990 | Garcia et al. | 350/96.24 |
| 4,917,516 | 4/1990 | Retter | 400/489 |
| 4,928,093 | 5/1990 | Rahman | 340/709 |
| 4,939,508 | 7/1990 | Lawrence et al. | 340/710 |
| 4,952,919 | 8/1990 | Nippoldt | 340/710 |
| 4,961,138 | 10/1990 | Gorniak | 364/200 |
| 4,962,475 | 10/1990 | Hernandez et al. | 364/900 |
| 4,977,397 | 12/1990 | Kuo et al. | 340/710 |
| 5,008,528 | 4/1991 | Duchon | 250/221 |
| 5,095,302 | 3/1992 | McLean et al. | 340/710 |
| 5,095,303 | 3/1992 | Clark et al. | 340/710 |
| 5,111,005 | 5/1992 | Smith et al. | 178/19 |
| 5,167,781 | 11/1992 | Cambridge | 340/709 |

FOREIGN PATENT DOCUMENTS 60-193032 1/1985 Japan .

OTHER PUBLICATIONS

IBM Technical Disclosure Bulletin, vol. 27 No. 6, Nov. 1984 "Mouse" by H. Nomura and A. Saitoh.
Carrabine, Laura, "Plugging into the Computer to Sense," Computer-Aided Engineering, Jun. 1990.
Foley, James D. et al., Computer Graphics: Principles and Practice (2d Ed.), pp. 188-195 & 354-57, Addison-Wesley Publishing Company, 1990.
"Tablet-Based Valuators That Provide One, Two, or Three Degrees of Freedom" by Kenneth B. Evans, Peter P. Tanner and Marecli Wein, dated Aug. 1981, pp. 91-97, vol. 15, No. 3, Computer Graphics.

Primary Examiner—Ulysses Weldon
Assistant Examiner—Gin Goon
Attorney, Agent, or Firm—Weingarten, Schurgin, Gagnebin & Hayes

[57] ABSTRACT

An input device for providing multi-dimensional spatial input data to a computer is disclosed. The device incorporates multiple independently operable locating members or input mechanisms, such as a roller ball for entry of two translational coordinates, a thumb wheel for entry of a third translational coordinate, and a trackball for entry of three rotational coordinates. The input mechanisms are also available for performing additional or alternative functions. The input mechanisms may be configured in several arrangements, while a single unified interface is presented to the host computer regardless of the configuration. In an additional embodiment, a seventh degree of freedom can be provided by sensing rotation of the housing containing the locating members.

11 Claims, 11 Drawing Sheets

MULTI-DIMENSIONAL INPUT DEVICE

RELATED APPLICATION

This application is a continuation-in-part of Ser. No. 07/739,833 filed Aug. 2, 1991, now abandoned, entitled THREE-DIMENSIONAL INPUT DEVICE.

FIELD OF THE INVENTION

This invention relates to the field of computer input devices and more particularly to the field of devices for entering three-dimensional spatial positional data to a computer.

BACKGROUND OF THE INVENTION

With the increasing sophistication of computer hardware and software graphic capabilities to display a representation of a three-dimensional object, there has come an increasing need for devices for entering into the computer three-dimensional spatial positional information. The motion of a rigid body in space has six degrees of freedom, three translational coordinates and three rotational coordinates with respect to a set of three mutually orthogonal axes. Therefore, to completely describe the position and orientation in space of an object to be displayed on a computer screen, six independent parameters must be supplied to the computer.

One approach for entering spatial positional data into a computer has been to use a traditional two-dimensional input device such as a mouse and specialized software to translate the two-dimensional inputs into three-dimensional representation This approach requires the user to indicate in some manner what the input data represents. Such indications are provided, for example, by icons displayed on the computer monitor which the user may choose by moving the cursor via movement of the mouse to the appropriate icon and pressing a button to choose that icon. For translational movement, this task is cumbersome, but not too difficult. However, the input of rotation coordinates in this manner is not intuitive and frequently poses great difficulty for the user.

A valuator or dial box is commonly used with CAD/CAM systems. This device normally provides eight knobs or dials. Six are used for entry of the six spatial parameters and two are used for additional one-dimensional input. Again, this is a cumbersome approach.

Another type of three-dimensional input device is a trackball which is capable of sensing translation in two dimensions or rotation about three orthogonal axes. Again, this device inputs only three coordinates. To distinguish between rotational data and translational data, the user must indicate in some manner the type of information being entered, as, for example, by choosing an appropriate icon, by pressing a button, or by pressing a key on a keyboard.

A further type of input device is "free flying" and incorporates electromagnetic sensors or accelerometers. This device is held by a user in the air and moved around through space, and, for example, six accelerometers within the device measure accelerations with respect to three orthogonal axes. The accelerations are integrated twice to calculate the translational and rotational coordinates. This device maps hand movement intuitively into movement of the cursor or object displayed on the computer monitor.

However, this device has several disadvantages. It is easily jiggled when the user pushes the buttons. Further, unless extremely accurate accelerometers are used, errors are introduced which grow larger as the integrations are performed. Additionally, it is difficult to separate translation from rotation when moving a free flying device, for example, to limit entry of translational data to a fixed plane; this separation may only be accomplished with specific software, not by the user's manipulation of the device. However, it is generally not necessary for the user to have translation and rotation coupled; generally, for CAD applications, it is more convenient to enter translation and rotation separately. Also, a typical mouse may be repositioned on the work surface simply by lifting it up and moving it to a new location, known as stroking; no movement is sensed during the stroking. Stroking is not possible with a free flying device. Instead, the user must indicate in some manner that the device is to be repositioned in space, generally by pushing a button to indicate that no movements are to be sensed.

Another known device is a rigid sphere containing strain gauges which the user pushes and pulls in any direction to provide three-dimensional translation and orientation. This device is not integrated with a two-dimensional pointing device and requires a large work surface with extra platform and power supply. The user's hand does not actually move and, therefore, the user must rely on motions of the screen object for visual feedback. The inputs must be integrated in order to get velocities or displacements. Thus, the user needs some initial training to get accustomed to the use of this device.

SUMMARY OF THE INVENTION

The present invention relates to a three-dimensional input device which allows a user to enter all six degrees of freedom, three translational coordinates and three rotational coordinates, simply, independently, and in an intuitive manner. The device is formed as a handpiece sized and shaped to fit a user's hand. In the preferred embodiment the translational coordinates are entered by a roller ball mounted to project beneath the housing of the device and a thumb wheel mounted to project from a side. The roller ball provides input of two translational coordinates with respect to two orthogonal axes. The thumb wheel provides input of a third translational coordinate, generally, although not necessarily, with respect to a third axis orthogonal to the first two axes. The three rotational coordinates are entered through a rotatable trackball mounted to protrude from the top of the device. The roller ball, thumb wheel, and trackball are each operable independently of the other two.

In operation, a user grasps the housing of the input device, as with a conventional mouse input device. To enter translational coordinates lying in the plane of the work surface, the user moves the entire housing, thereby moving the roller ball. To enter the third translational coordinate, the user's thumb rotates the thumbwheel on the side. To enter the rotational coordinates, the user rotates the trackball projecting from the top of the housing. Three general purpose buttons 42 are also provided to actuate various other functions. Accordingly, the input device of the present invention provides for independent entry of the required six degrees of freedom in a simple and intuitive manner.

Encoders, such as optical encoders which use quadrature phase encoding and are commonly provided in conventional mouse input devices, are used to sense and measure the movements of the roller ball, thumb wheel, and trackball. Additionally, the trackball may be supported entirely at three points which may be provided by three encoders. The encoders send a signal representative of the direction and magnitude of movement to a controller. The controller transmits the data to the host computer or other device. The controller also has a storage capability for storing the data from the encoders.

The device is particularly suitable for applications in which three-dimensional figures or drawings are to be spatially reoriented. For example, chemical drawings often require the rotation of molecules. Architectural drawing software frequently provides a user with the ability to "walk through" rooms of a building. The user can change the point of view to observe a room from any angle or to exit a room and enter another. For such applications, it is not necessary that the rotational coordinates be entered simultaneously with the translational coordinates. Frequently, it is conceptually simpler for the user to enter these coordinates separately. Further, by allowing independent entry of these coordinates, the device itself can be made much more simply.

The three locating members are also available to perform other functions which conventionally must be performed by pressing keys on the keyboard. By providing the ability to actuate many additional functions from one input device, the user need not disrupt his thoughts to move his hand or eyes to the keyboard.

In a further embodiment, the input device can be configured in a distributed arrangement. For example, two assemblages, one housing a roller ball or mouse input mechanism and a second housing trackball and thumbwheel input mechanisms, may be provided. The device driver may be reconfigured to set the input mechanisms up in a variety of arrangements, while presenting a single unified interface to the application or host computer.

In an additional embodiment of the present invention, a seventh degree of freedom is provided by sensing rotation of the housing of the input device. A seventh degree of freedom is useful in applications such as architectural walk-throughs, which may be modeled as a camera mounted on a moveable pushcart. Three translational degrees of freedom enable the pushcart to translate. Three rotational degrees of freedom enable the camera to rotate on top of the pushcart. The seventh rotational degree of freedom enables the push cart to rotate about a vertical axis independently of the camera, to make turning corners more intuitive.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
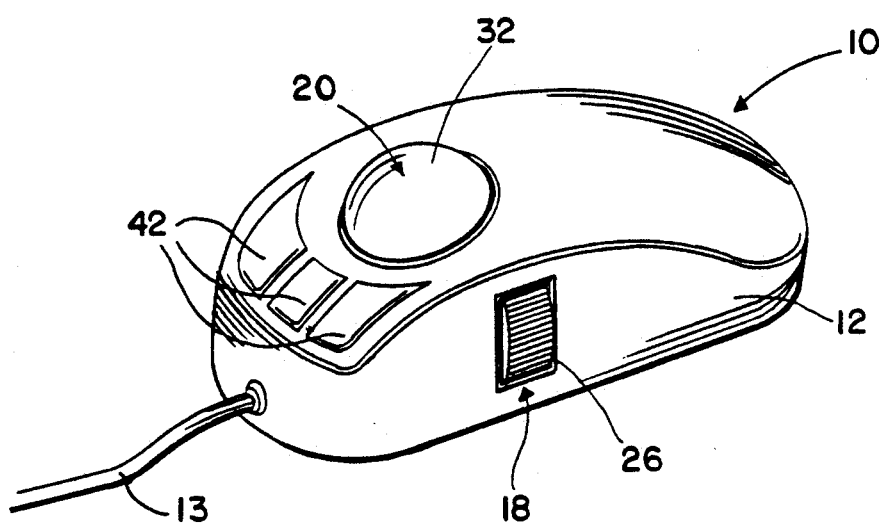
FIG. 1 is a perspective view of an input device according to the present invention.
Figure 2:
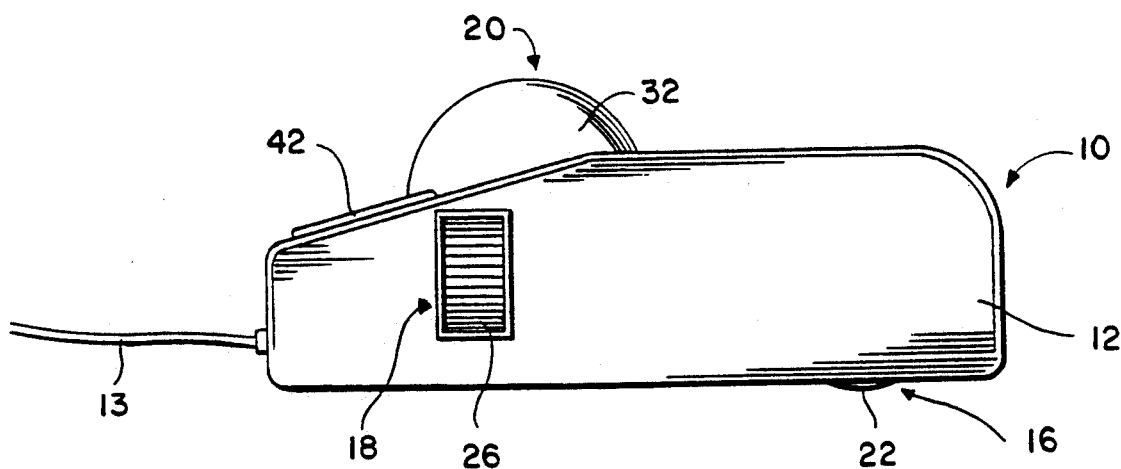
FIG. 2 is a side view of the input device of FIG. 1.

The input device of the present invention is shown generally at 10 in FIGS. 1 and 2. The device comprises a handpiece which may be readily grasped by a user and moved about on a work surface on which the device rests, as with a conventional mouse. The handpiece is formed with an outer housing 12 and is connected to a host computer (not shown) via a cord 13.

Three locating members 16,18,20 operable by the user are provided on the handpiece. Each locating member is operable independently of the other locating members. The first locating member 16 provides for user input of two-dimensional data, such as movement of a cursor in a single plane, in the form of two translational coordinates x and y with respect to a pair of orthogonal axes. The second locating member 18 provides for user input of a third translational coordinate z with respect to a third axis which is mutually orthogonal to the first pair of axes. This input allows a user to, for example, move a cursor around in a displayed figure to indicate depth. The third locating member 20 provides for user input of three rotational coordinates $\phi$, $\Theta$, and $\phi$. These coordinates are determined with respect to a set of three mutually orthogonal axes. This input allows a user to, for example, rotate a displayed figure or change a point of view. A position and orientation in space may be completely described with these six coordinates or degrees of freedom.

In the preferred embodiment, the first locating member 16 comprises a roller ball 22 such as is found on a conventional mouse. The roller ball is used to enter two of the translational coordinates, x and y. The second locating member 18 is a thumb wheel 26 protruding from the side of the housing to enter the third translational coordinate, z. The third locating member 20 is provided by a trackball 32 on top of the housing for entering the three rotational coordinates $\phi$, $\Theta$, and $\phi$. Buttons 42 on top of the housing operate electrical switches to activate various software functions as in a conventional mouse. Typically, three buttons are provided.

The device shown in FIGS. 1 and 2 is oriented for a right hand user. The hand rests on top of the device with the fingers placed to press the buttons 42 or rotate the trackball 32. The thumb rests against the left side of the housing 12 to rotate the thumbwheel 26 protruding from the side. The user's hand can also grasp the housing 14 to move the entire housing over the work surface for rotation of the roller ball 22. The device could also be oriented for a left hand user, if desired.

Encoders 52,54,56,62,64,66 sense and measure movement of the locating members and generate a signal representative of the respective translational and rotational coordinates. The encoders include a sensing member which senses the motion of the associated locating member. Preferably, optical encoders such as are commonly used with mouse roller balls may be provided. However, other types of encoders may be used as well.

Figure 3:
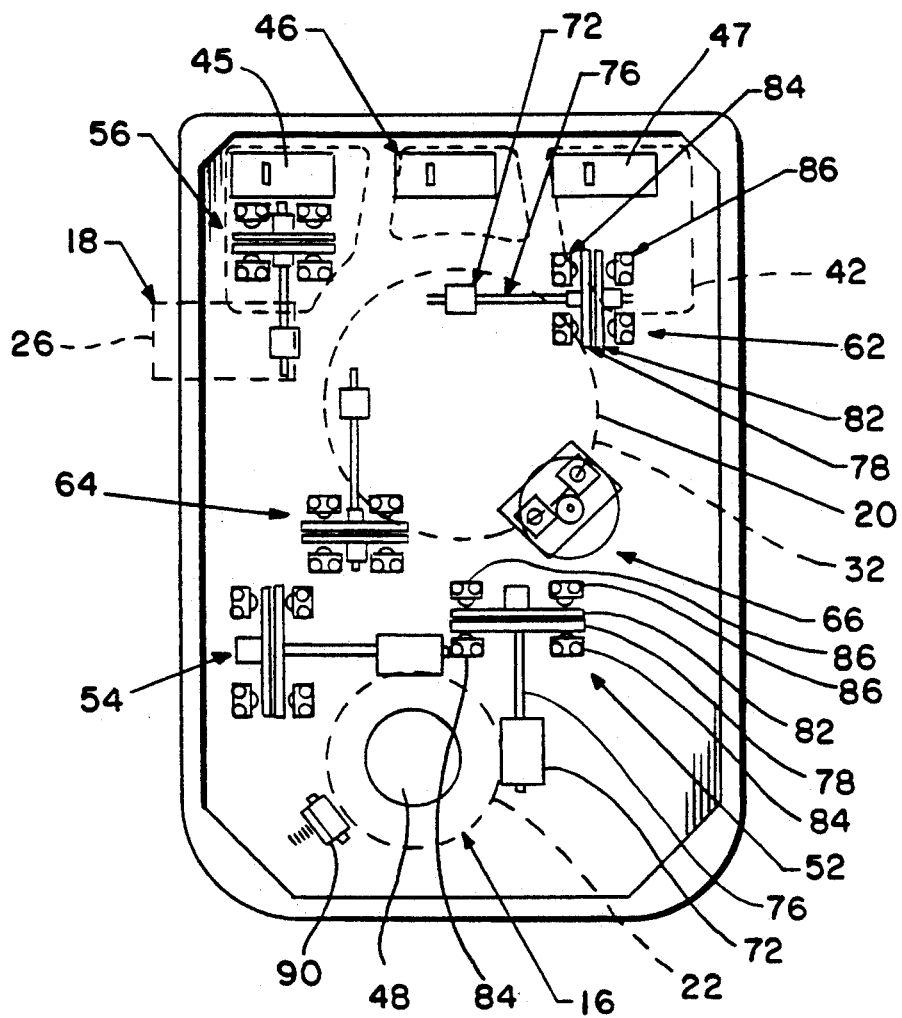
FIG. 3 is a top plan view of a preferred embodiment of the input device of the present invention.
Figure 4:
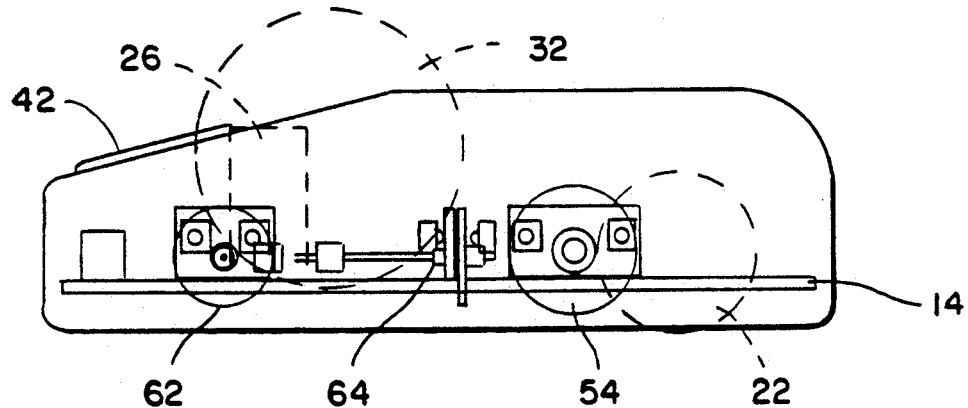
FIG. 4 is a side view of the embodiment of FIG. 3.
Figure 5:
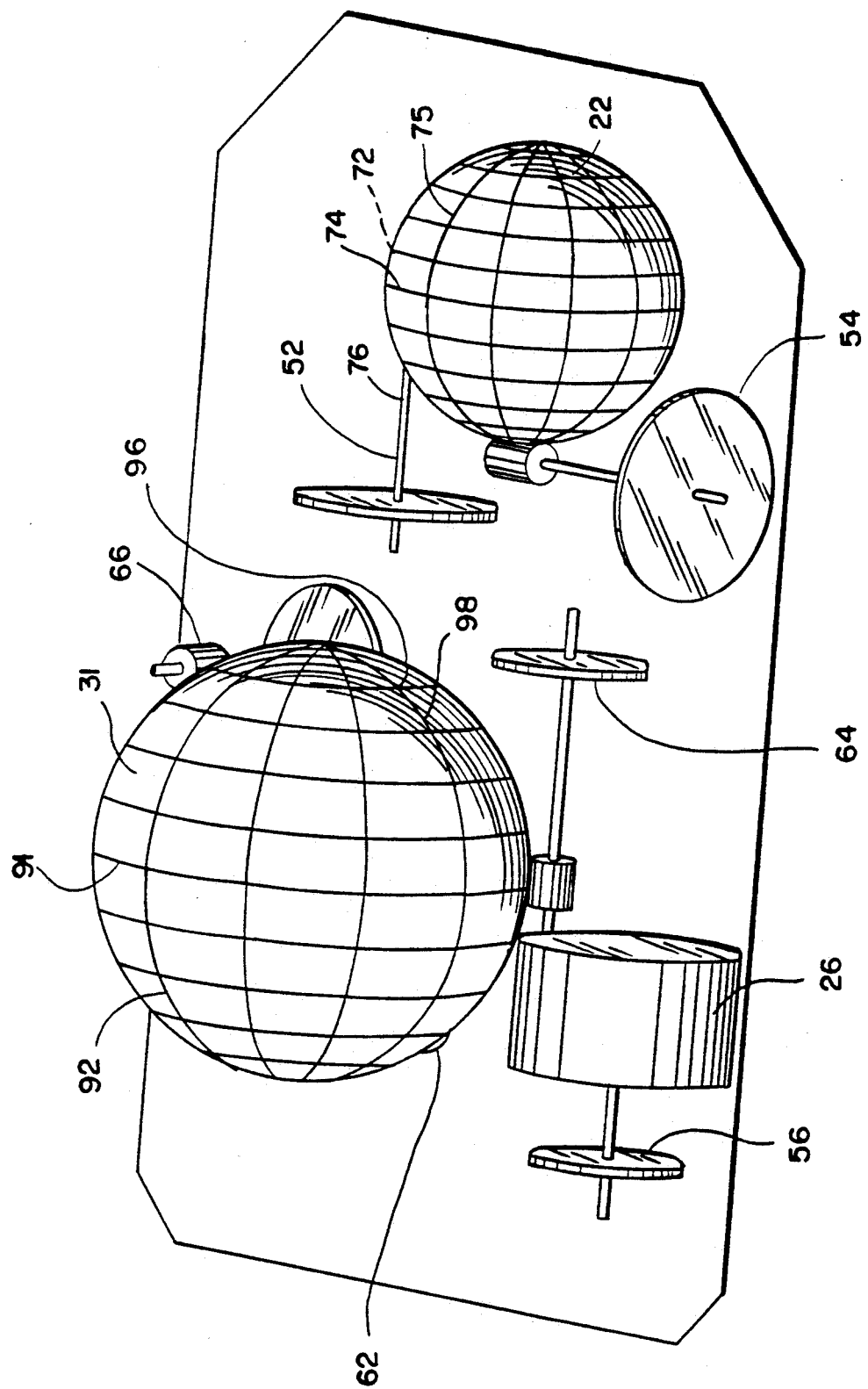
FIG. 5 is a schematic perspective view of the geometry of the sensors of the embodiment of FIG. 3.

The arrangement and orientation of the three locating members and the encoders in the preferred embodiment are shown with more particularity in FIGS. 3 through 5. The housing 12 of the input device includes a base plate 14 on which the components are mounted. The roller ball 22 (shown in phantom in FIGS. 3 and 4) may be mounted in any suitable manner and typically is constrained by a circular opening 48 in the base plate 14. The roller ball protrudes slightly through the opening 48 to contact the work surface when the base plate of the handpiece is placed on the work surface.

Two encoders 52, 54 are associated with the roller ball 22, one for the x translational coordinate and one for the y translational coordinate. The x translation encoder 52 will be more particularly described, the other encoders being similar to the x encoder. The encoder is provided with a roller member 72 which contacts the spherical surface of the roller ball 22 at a point on a great circle 74, shown in FIG. 5. The roller member 72 is mounted on a rotatable shaft 76 for rotation as the roller ball rotates. The roller member 72 may be biased, for example, by a spring (not shown), into contact with the roller ball 22. As the roller ball rotates, the roller member traverses a path defined by the great circle 74 over the surface of the roller ball.

At an opposite end of the shaft 76, a rotating encoder wheel 78 and stationary phase plate 82 are provided. The encoder wheel rotates as the shaft rotates. Both the rotating encoder wheel and phase plate are provided with spaced radial slits. A pair of light emitting diodes 84 are mounted on the base plate 14 proximate the encoder wheel 78 and a pair of photo transistors 86 are mounted proximate the phase plate 82. As the encoder wheel rotates, it periodically permits the light from the LEDs to pass through the slits, when the slits of the encoder wheel and phase plate are in alignment. The photo transistors detect the light passing through a slit. A controller 102, indicated in FIG. 6, counts the number of detections of the light through the slits. The number of detections is proportional to the magnitude of the distance traversed by the rotating roller member 72 along the great circle 74. A pair of LEDs 84 and photo transistors 86 are provided for each encoder so that the direction of rotation may be determined by conventional quadrature phase encoding.

The y translation encoder 54 is similar to the x translation encoder 52; however, the y translation encoder is oriented at 90 degrees to the x encoder. The y encoder also traverses a great circle path 75 on the spherical surface of the roller ball 22, as seen in FIG. 5. The controller 102 interprets the signals from the x and y encoders as translations with respect to a pair of mutually orthogonal x and y axes. The work surface on which the operator rotates the roller ball 22 provides an intuitive x-y plane for the operator, so that the operator may easily relate movement of the roller ball over the work surface to movement in a plane on a graphical display.

The roller ball is be supported by three points. Two points are provided by the roller members of the x and y translation encoders. The third point is provided by a support member 90, which may be biassed, for example, with a spring, toward the roller member. Any other suitable supporting mechanism may be provided.

The thumb wheel 26 provides for entry of the third translational coordinate, z, which is normal to the x and y axes. A z translation encoder 56 is provided to sense and measure the rotation of the thumbwheel. The z translation encoder may be an optical encoder as described above for the x translation encoder. The z coordinate is determined with respect to an axis which is orthogonal to the x and y coordinate axes. However, as seen in FIG. 5, the z encoder does not need to be oriented orthogonally to the x and y encoders. The controller 102 interprets the rotation of the thumbwheel 26 as a translation with respect to the Z axis. However, the orientation of the thumbwheel on the side of the handpiece for rotation in a vertical plane provides the operator with an intuitive manner of entering the z coordinate. For example, the operator can easily indicate depth on a graphical display simply by rotating the thumbwheel.

The trackball 32 provides for input of the three rotational coordinates, $\phi$, $\Theta$, and $\phi$. Three encoders 62,64,66 are provided, one associated with each rotational coordinate. Each encoder may be similar to the x translational encoder described above. Each encoder traverses a great circle path 92,94,96 around the spherical surface of the trackball 32. Each great circle passe through a plane which is orthogonal to the planes of the other great circles. The controller interprets the rotation of the trackball as rotation about the respective, mutually orthogonal $\phi$, $\Theta$, and $\phi$ axes.

Each encoder must contact the sphere of the trackball at some point along its associated great circle. Preferably, two of the encoders, for example, the $\phi$ and $\Theta$ encoders 62,64 as seen in FIG. 5, are mounted on the base plate 14 to contact the trackball somewhat below the equator 98 of the sphere of the trackball. These encoders sense rotational motion about the two orthogonal axes which preferably are oriented generally horizontally or parallel to the base plate; thus, the axes of rotation of these encoders are oriented generally horizontally or parallel to the base plate. Accordingly, the third or $\phi$ encoder 66 must be oriented such that its rotation axis extends vertically with respect to the other two encoders.

The third encoder preferably contacts the trackball along a great circle 94 which corresponds to the equator 98 of the spherical surface of the trackball. By mounting the three encoders so that two encoders contact the trackball below the equator and the third contacts the trackball on the equator, the trackball may be supported entirely by the encoders. The encoders do not need to be biased into contact with the trackball. No additional points of support for the trackball need to be provided, although they may if desired. However, fewer points of support provide a simpler, more reliable mechanism.

Preferably, the encoder wheel and phase plate of the $\phi$ encoder are located below the equator of the trackball to provide the most compact arrangement of components within the housing 12. The encoder wheel and plane optionally could extend above the equator; however, the housing 12 would generally need to be raised to accommodate the added height, which can interfere with access to the trackball through an opening in the top of the housing.

Buttons 42 operate switches 45,46,47 mounted on the base 14. The switches activate various software functions such as are conventionally found on mouse input devices.

Figure 6:
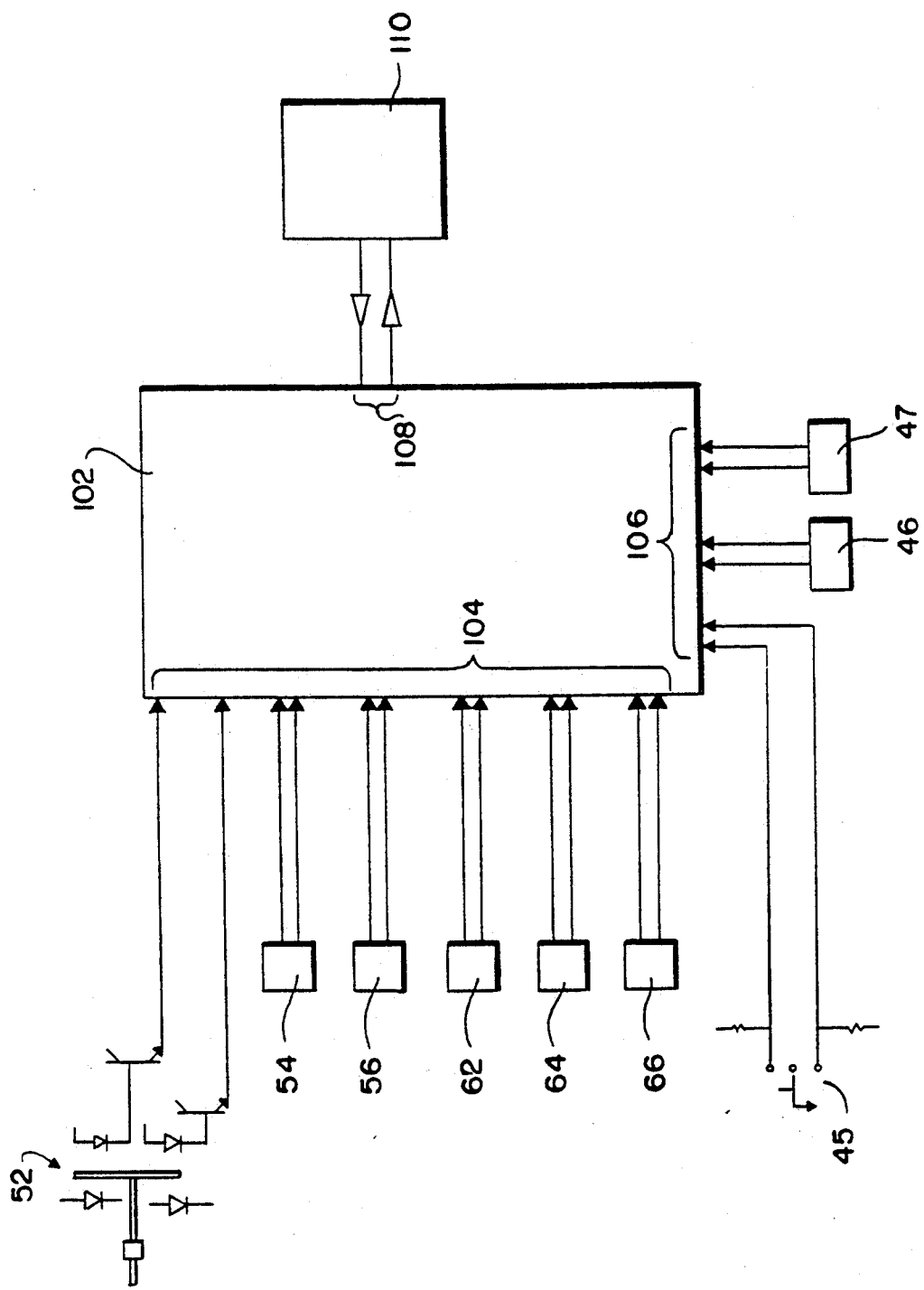
FIG. 6 is a block diagram of the input device according to the present invention.

As set forth above, the signals from the encoder are transmitted to a controller 102, as shown in FIG. 6. A parallel port provided on the controller provides for the input of twelve lines 104 from the encoders: the six encoders provide two signals each, one from each of the photo transistors, to enable the determination of both magnitude and direction of motion. Only x translation encoder 52 is indicated with particularity on FIG. 6; the remaining encoders are indicated more generally. Also, any suitable circuitry may be provided.

The parallel port of the controller 102 also provides for the input of six additional lines 106 from the three switches 45,46,47 associated with the three buttons 42 on the hand piece. Only switch 45 is shown with particularity, the other switches being shown more generally. Again, any suitable circuitry may be used.

The controller 102 initially assumes that all spatial input encoder sensors are still and samples the states of the buttons 42. This establishes an initial or current status of the inputs. The controller then samples all of the sensors 52,54,56,62,64,66 at a fixed frequency. The sampling frequency is determined by the maximum speed at which the trackball or the roller ball moves. Alternatively, an interrupt mechanism may be used by the controller to cut down the number of unnecessary samplings.

When the controller detects a change between consecutive samples, it records the change, updates the current status, and attempts to report the change to the host computer 110. If the change was in one of the sensors, the controller also determines the direction of rotation, and reports that information to the host as well. The host may also send messages to the controller to solicit information such as inputs, status reports, diagnostic data, or software/hardware version identification.

The controller 102 transfers the data to the host computer 110 through a serial port 103 such as an RS-232 interface. The serial interface may use a female 9 pin subminiature D connector. Optionally, a bus interface may be used.

The controller 102 communicates with the host computer 110 using one of several program selectable protocols. At power on, for example, the device may use a default serial protocol compatible with the five byte protocol used by the MicroSoft Mouse. After power on, the host application can set the input device to use a new interrupt driven protocol that supports three-dimensional coordinates.

Preferably, the coordinate data is transmitted to the host computer in eight data bytes. The first byte is a control byte, in which the leading bit (bit 7) is set as 1. Bits 6, 5, and 4 are indications of button status for the left, middle, and right button respectively. If the button is pressed, the bit is 1, otherwise it is 0. The other bits may indicate other controller related status data.

The second byte indicates a change in the x translational coordinate. Similarly the third byte indicates a change in the y translational coordinate and the fourth byte a change in the z translational coordinate. Bytes five, six, and seven indicate changes in the $\phi$, $\Theta$, and $\phi$ rotational coordinates, respectively. The leading bits of bytes two through seven are always the same, for example, 0. The eighth byte optionally provides a check sum, such as CRC or any other standard byte additive scheme.

Preferably, the input device obtains power from the host computer 110 through the serial port 108. Alternatively, a separate power supply may be provided.

The controller 102 also contains storage, such as internal RAM, for storing the data prior to its transmission to the host computer. Due to the transmission latency of transmitting a message to the host computer, the controller may have to delay reporting status changes and continue to monitor all sensors and buttons until the previous message has been completely delivered.

An input device driver is provided at the host 110. The device driver accepts inputs from the controller 102 on an interrupt basis. The device driver translates the data from the controller into virtual screen definitions to maintain a virtual screen. The driver calculates the current cursor position within the virtual screen and maintains presentation and movement control of the cursor.

Software for particular applications may be provided. Preferably, the software is provided in a layered structure, with the device driver software on the bottom layer and the application software above the driver software. The device driver accepts a cursor description for an application and displays the cursor on the screen. The application software queries the device driver for current cursor position within the virtual screen and requests notification of any cursor status change. Applications may also be provided o the device driver.

In addition to providing spatial input data, the input device of the present invention is also able to improve many human-computer interfaces typically done through screen interaction. The roller ball 22 can function as a conventional mouse with two-dimensional inputs, while the thumbwheel 26 and trackball 32 give the operator access to four extra independent inputs, all within the reach of the operator's hand.

Traditional screen icon interfaces use the two-dimensional cursor heavily, loading it with several disparate functions. In a typical CAD/CAM screen layout, for example, the two-dimensional mouse is used both to indicate position or select viewport entities, and to select a command from the command menus. To access a command during a screen-assisted operation such as entity selection or polyline drawing, the current viewport operation must be interrupted, losing the "current position" within the viewport. The cursor must be moved to point to the command menu item, and, after completion of the command operation, go back to the viewport to resume the original operation. Further, while the cursor is moving, the CAD software is unable to determine if the cursor movement is positioning within the viewport or is headed to the command menu to trigger a different command.

A similar example which arises in spreadsheet programs also shows the difficulties encountered with loading a two-dimensional pointing device such as the conventional mouse with multiple functions. With typical spreadsheet software, the cursor is typically used to locate the "cell" and to point to a command within the command menu on the same screen. To trigger a command while the cursor is pointing at the current cell, the cursor must move out of the current viewport and to the command menu, pull down the desired command menu, make the selection, and finally go back to the cell to resume operation.

These inconveniences can sometimes be avoided by using a keyboard as an additional source of operator inputs, thereby separating the pointing mechanism for the viewport objects from the command menu objects. However, to operate the keyboard, the operator must move his hand from the pointing device and must move his eyes from the screen to the keyboard to locate the keys and then back to the screen.

The present invention solves these difficulties by using the roller ball 22 as a conventional mouse to track the cursor for viewport objects and using the trackball for the command inputs. The trackball may be configured to operate in a two-dimensional rather than a three-dimensional mode, if desired. The operator's hand may stay on the input device, and the operator's eyes do not need to leave the screen to locate the keyboard. Alternatively, the trackball 32 may be used, either two-dimensionally or three-dimensionally, for the viewport objects, and the roller ball 22 may by used for pointing to the command menu items. Similarly, if the command menu is laid out linearly, the thumbwheel 26 may also be used for pointing to the command menu items.

The preferred embodiment provides a roller ball as the first locating member, a thumb wheel as the second locating member, and a trackball as the third locating member. Alternatively, other types of locating members could be provided. For example, the first locating member could comprise any suitable component for entry of two-dimensional translational data. Such components include, for example, a joy stick, data tablet and stylus, or puck. Similarly, the second locating member could comprise any suitable component for entry of a one-dimensional translational coordinate, such as a switch or pressure sensitive device. The third locating member could comprise any suitable component for entry of three rotational coordinates, such as a joy stick.

Figure 7:
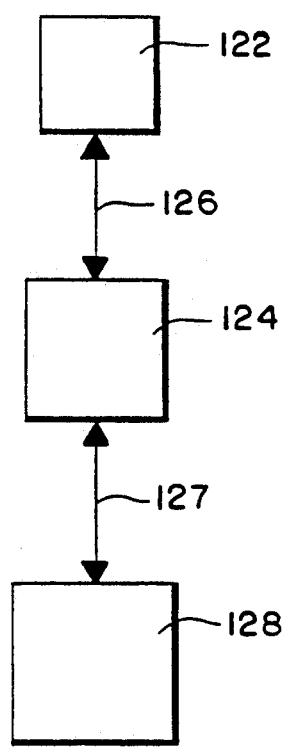
FIGS. 7 through 11 are schematic diagrams of alternative configurations of the present invention.
Figure 8:
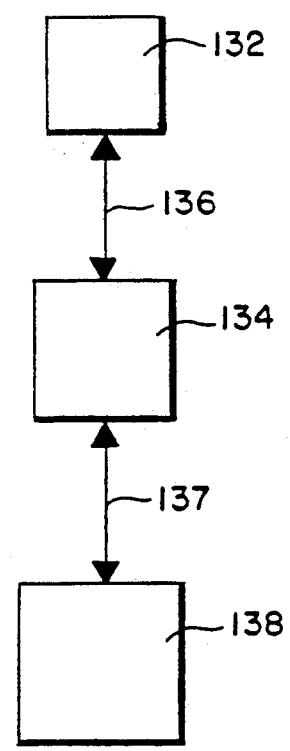

While the input device has been described as an integral assemblage with all input mechanisms contained in a single housing or chassis, a distributed configuration is also contemplated by the present invention. For example, as shown in FIG. 7, two assemblages 122, 124 may be provided, the first assemblage 122 comprising a two-dimensional input mechanism, such as a roller ball (or mouse) or trackball, and the second assemblage 124 comprising a three-dimensional trackball mechanism. A one-dimensional input mechanism, for example, a thumbwheel functioning as a valuator, may also, if desired, be associated with either the three-dimensional assemblage 124, as shown in FIG. 7, or the two-dimensional assemblage 122 (not shown). The two-dimensional assemblage may be connected to the host through the three dimensional assemblage via an interface 126, the three-dimensional assemblage being attached to the host computer 128 directly through a further interface 127. The interfaces may be serial or parallel. Alternatively, as shown in FIG. 8, a three-dimensional assemblage 132 may be connected to a host computer 138 through a two-dimensional assemblage 134 via interface 136, the two-dimensional assemblage being attached to the host computer through interface 137.

Each assemblage is independently openable by the user and comprises a separate housing or chassis independently manipulable by the user. For example, the two-dimensional assemblage may be operated by the user's right hand and the three-dimensional assemblage may be operated by the user's left hand. In some applications, such as for manipulating two cursors, two-handed control may be more useful than, for example, a single mouse device.

Figure 9:
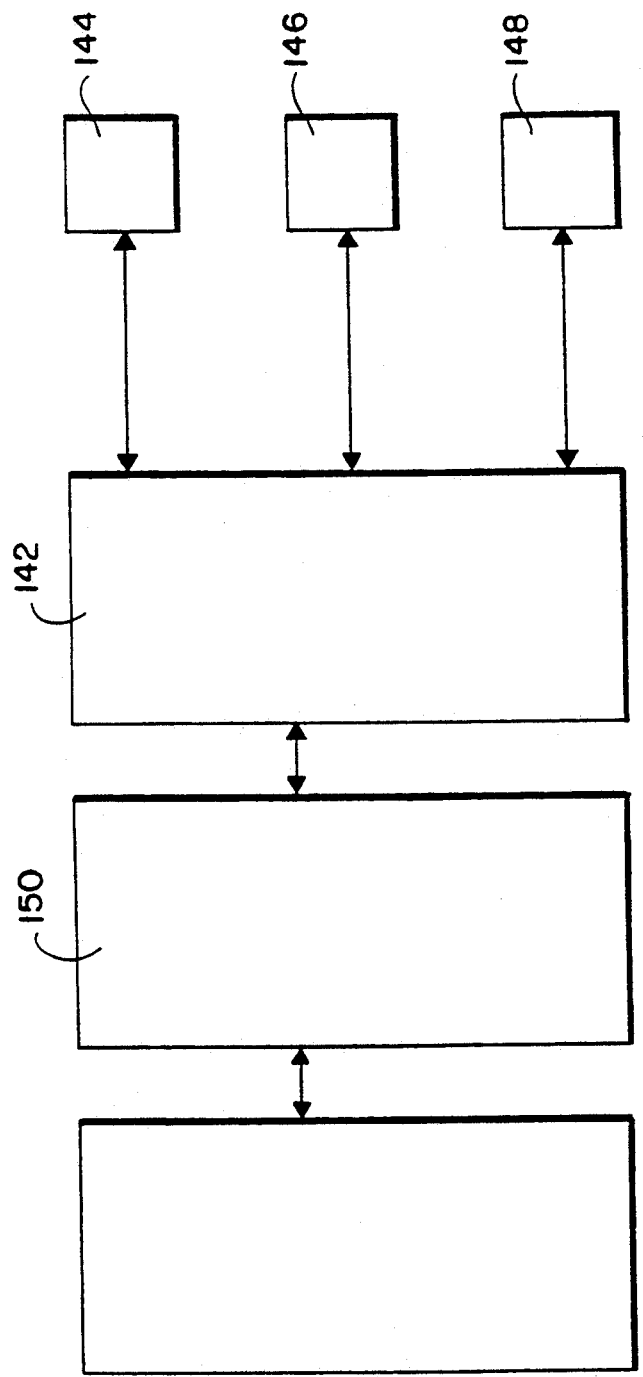

A unified interface between the distributed input mechanisms and the host computer is provided so that the input mechanisms may operate as if they were provided in an integral unit. A schematic diagram of the preferred arrangement is shown in FIG. 9, in which a single controller 142 is provided for receiving the raw inputs from the locating members or input mechanisms 144, 146, 148. A device driver 150 interfaces between the controller and the application, so that the application is unaware of the configuration of the assemblages and mechanisms.

For compatibility with traditional two-dimensional pointing devices, the driver may be initialized as either "mouse" mode or "trackball" mode. The driver selects the proper assemblage to control the two-dimensional, or system, cursor based on the defined mode. During execution of an application, the driver may be reconfigured to provide inputs from any of the various assemblage configurations. For example, the following bit pattern (of 8 bits) may be defined:

| Mask Bit | Definition |
|---|---|
|  | Active mechanism selection: |
| 0 | Mouse mechanism. |
| 1 | Trackball mechanism with two-dimensional cursor support. |
| 2 | Trackball mechanism with orientation or rotation angle support. |
| 3 | Thumbwheel mechanism. |
| 4 | Predominant mechanism selection |

Thus, if bit 0 is on, inputs will be accepted from the two-dimensional roller ball or mouse mechanism. If bit 1 or bit 2 is on, inputs will be accepted from the trackball mechanism. In the above definition, bits 1 and 2 are mutually exclusive. Thus, if bit 1 is on, the trackball can function as a traditional two-dimensional input device; if bit 2 is on, the trackball provides three-dimensional inputs, or inputs from all three encoders. If bit 3 is on, inputs will be accepted from the thumbwheel mechanism.

Bit 4 is used to distinguish between two modes of active mechanisms. If bit 4 is off, all selected mechanisms are considered active and all inputs are transmitted to the host or application. For example, if both bits 0 and 3 are on, both the mouse mechanism and the thumbwheel mechanism will be active and inputs from both of these mechanisms are accepted. Thus, if bit 4 is off, all selected mechanisms function as an integral unit, providing as many degrees of freedom to the application as are available from the selected mechanisms. The input mechanisms operate as a single unit even if implemented on separate chassis.

If bit 4 is on, inputs from the selected mechanisms are compared. The mechanism with the maximum amount of movement is selected as the "predominant" mechanism. Only inputs from the predominant mechanism are transmitted to the application.

With the capability of configuring the various input mechanisms in different ways, the driver is able to present a single unified interface to the application. For example, if the bit pattern is such that bit 0 is on and all other bits, including bit 4, off (expressed in hexadecimal as 01), the device can be configured to operate as a traditional two-dimensional mouse. If bit 1 is on (hex 02), the device as a traditional two-dimensional trackball. If both the mouse and trackball mechanisms are defined as active (bits 0 and 1 on, hex 03), two independently controllable cursors may be supported on the computer display screen. If the mouse and thumbwheel mechanisms are active (bits 0 and 3 on, hex 09), pure three-dimensional translational inputs may be provided.

If bits 0, 2, and 3 are on (hex 0D), six degrees of freedom are supported.

With bit 4 on, if bits 0, 1, and 3 are on (hex 1B), all three mechanisms are selected, for example, to support two cursors. Since bit 4 is on, only output signals from the predominant mechanism are transmitted. This is advantageous if two or more mechanisms are implemented in one chassis. For example, activating one mechanism may unintentionally disturb the other mechanism by jiggling of the chassis, generating a signal indicative of a small movement. However, the signal would not be transmitted, since the disturbed mechanism would not be selected as the predominant mechanism.

Figure 10:
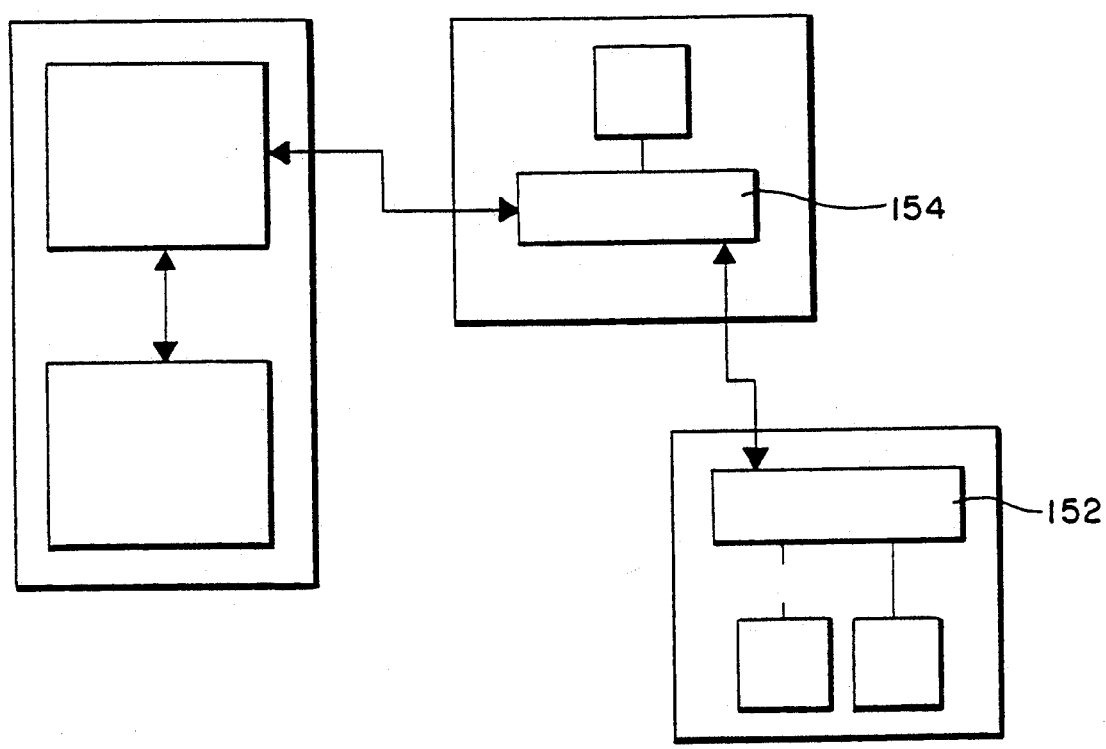
Figure 11:
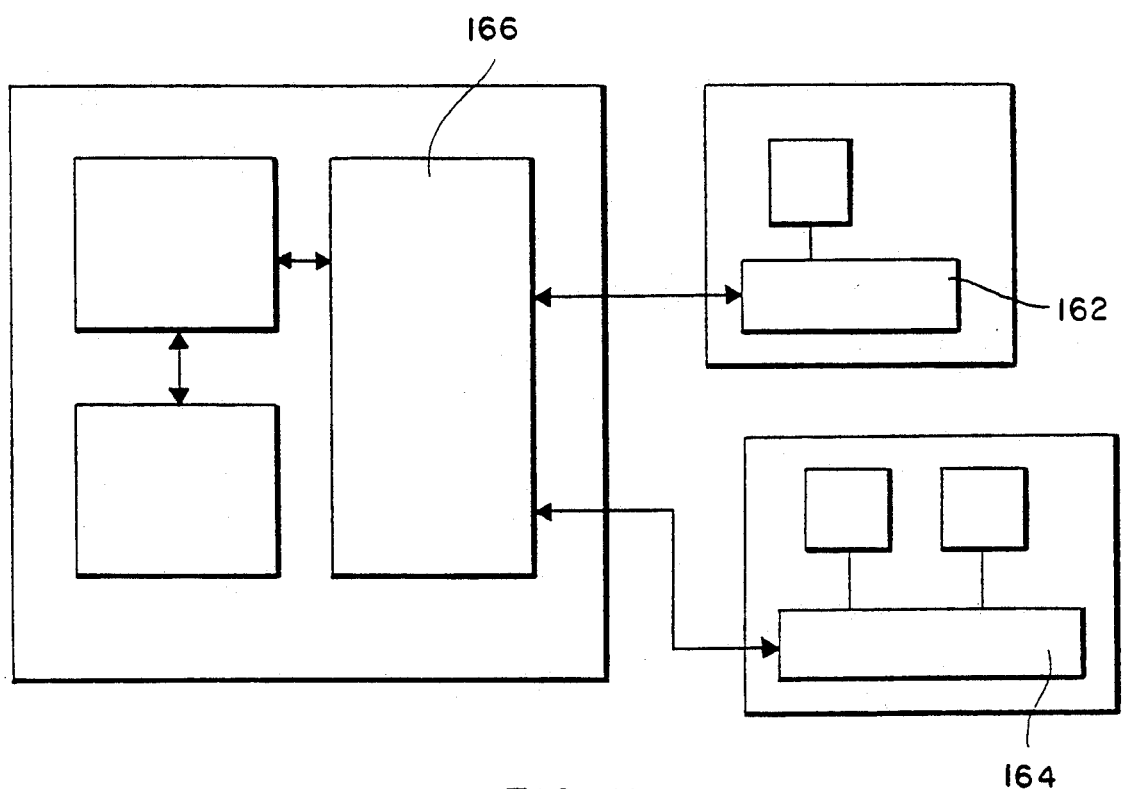

A distributed configuration of the controller is also contemplated by the invention. For example a separate auxiliary controller 152 may be associated with one of the assemblages, such as the two-dimensional assemblage as shown in FIG. 10. This controller is connected to the primary controller 154, which is associated with the three-dimensional assemblage. The auxiliary controller transmits signals to the primary controller, which collects all signals and transmits them to the device driver. The opposite arrangement, in which a separate auxiliary controller is associated with the three-dimensional assemblage and connected to a primary controller associated with the two-dimensional assemblage, is also possible. Similarly, as shown in FIG. 11, both the three-dimensional assemblage and the two-dimensional assemblage may be provided with auxiliary controllers 162, 164, each of which is connected to the primary controller 166. The primary controller may be provided at the host computer if desired.

A further embodiment of the present invention provides up to seven degrees of freedom by detecting rotation of the input device housing about an axis perpendicular to the plane over which the housing is translated. Two-dimensional roller balls which detect only translational movements are not affected by rotation of the housing which contains the roller ball. Thus, a cursor which is controlled by a two-dimensional roller ball will maintain a straight line course even if the user zig zags the roller ball by rotating the housing.

In the embodiment of the present invention, a seventh additional input is provided. Six inputs are translational with respect to mutually orthogonal axes, x, y, z, and rotation about those axes, as described above. The additional seventh input detects rotational orientation of the housing by measuring rotational movement of the housing about an axis perpendicular to the x-y plane.

Figure 12:
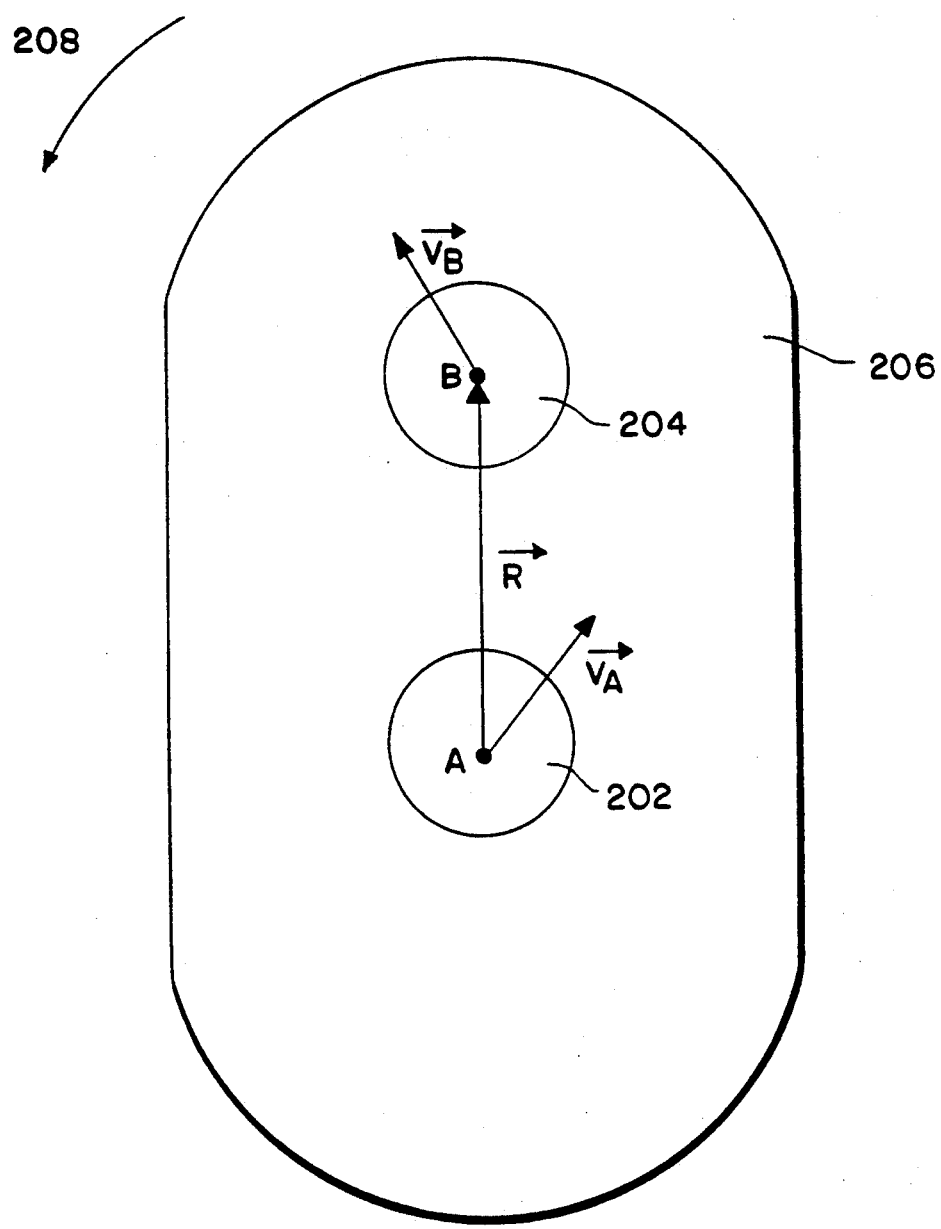
FIG. 12 is a schematic diagram of a further embodiment of the present invention for sensing rotation of the device housing.

In the preferred embodiment, sensing the rotational orientation is implemented by providing two roller balls 202, 204 with associated encoders in the housing 206. The roller balls may be similar to the roller ball 22 described above, and preferably roller ball 22 also serves as one of the roller balls 202 or 204. As shown schematically in FIG. 12, the two roller balls are spaced at a fixed predetermined distance from each other in the housing. Each roller ball protrudes below the bottom of the housing to contact the work surface and senses translational movement of the housing at their respective locations relative to the bottom plane of the housing, identified as points A and B respectively.

As the housing 206 is moved over the work surface, the housing rotates as indicated by arrow 208, and the roller balls sense translational movement over the surface. $\vec{V}_A$, the velocity at point A, and $\vec{V}_B$, the velocity at point B, are determined from the x and y translational sensors associated with each roller ball. Since the position vector $\vec{R}$ of point B with respect to point A is a known constant, the angular velocity $\vec{\Omega}$ can be calculated from the known and measured values of $\vec{R}$, $\vec{V}_A$, and $\vec{V}_B$ as follows:

$$\vec{V}_B \vec{V}_A + \vec{\Omega} \times \vec{R}$$

where x denotes the cross product of two vectors.

From this equation, $$\begin{aligned}\vec{R} \times (\vec{V}_B - \vec{V}_A) &= \vec{R} \times (\vec{\Omega} \times \vec{R}) \\ &= (\vec{R} \cdot \vec{R})\vec{\Omega} - (\vec{R} \cdot \vec{\Omega})\vec{R} \\ &= |\vec{R}|^2 \vec{\Omega}\end{aligned}$$

where·indicates the inner product of two vectors. $\vec{\Omega}$ can then be determined as follows:

$$\vec{\Omega} = \frac{\vec{R} \times (\vec{V}_B - \vec{V}_A)}{|\vec{R}|^2}$$

$\vec{\Omega}$ is perpendicular to the planar surface over which the housing moves and is not a function of position. The final rotational orientation of the housing is then determined by accumulating $\vec{\Omega}$ over a specified time period.

With this seventh rotational input, the input device can be used for a greater variety of tasks, depending on the combination of locating members. For example, the device can operate as a two-dimensional mouse with z axis rotation when combined with the roller ball for the translational inputs. Or the device can add z axis rotation to three-dimensional translational inputs when combined with the roller ball and thumb wheel.

When combined with the roller ball and track wheel, the device can simulate the manipulation of a push cart with a camera mounted on top. Such push cart simulations are useful for walking through a building. The user manipulates the input device to move the push cart on a floor or plane within the building. Rotation of the housing changes the viewing angle. The x and y translational inputs and z axis rotation simulate motion of the push cart, while the rotational inputs from the track wheel simulate rotation of the camera. When the third translational input from the thumb wheel is included, the height of the push cart or the camera can be made adjustable. Alternatively, the thumb wheel can be used for lifting the cart up to another floor or up a stairway All these functions can be performed directly and intuitively by the user, since each input device can be operated independently of the others.

In a further embodiment, a control stick with a base comprising a ball is mounted in the housing in a manner similar to the manner in which the track ball is mounted as described above. If desired, the track ball may be removed and the control stick mounted in the track ball's place. A removable cover plate may be provided in top of the housing for this purpose. The control stick has three degrees of freedom relative to the housing and can also be used to move the entire housing which allows the two-dimensional roller ball to sense translational movement. This ability gives the user the ability to control the cursor or any object in five degrees of freedom. The user can lift the entire housing by the control stick for stroking actions, since the control stick is held in the housing by the cover plate.

Although the range of rotational movements about two of the three axes of the control stick is restricted by the housing, the control stick does provide an intuitive simulation of movements of the human head, which has limited rotational range, or rotation about a vertical axis of a camera mounted on a push cart.

Additionally, the rotational movements of the control stick vertical or z axis, by filtering the unwanted components through software or mechanically by, for example, a cover plate which allows only rotation about a vertical axis. Further functions may be provided by providing buttons on the control stick where they can be accessed by the finger tips. Similarly, the thumb wheel may be provided on the control stick itself.

The invention is not to be limited by what has been particularly shown and described, except as indicated in the appended claims.

I claim:

1. A hand manipulatable input device for providing spatial locational data to a host computer for control of a simulated viewpoint coupled to the input device, the input device comprising:
   a chassis including an outer housing sized and configured to be received by a hand of a user in a grasping position;
   a first locating member comprising a roller ball supported by the chassis and mounted with a portion of the roller ball projecting from a base of the housing to rotatably contact a planar surface and movable by manipulation of the housing by the hand of the user in simulation of translational movement of the simulated viewpoint in a simulated plane in a simulated space;
   a first encoder for detecting movement of the first locating member and for producing output signals proportional to the detected movement of the first locating member and representative of the translational movement along a first set of first and second mutually orthogonal axes in a first plane representative of the simulated plane;
   a second locating member comprising a thumbwheel supported by the chassis to rotate in a direction perpendicular to the planar surface and located to be simultaneously manipulatable with said first locating member and mounted with a portion of the thumbwheel projecting from a side of the housing in a location proximate a thumb of the hand in the grasping position and movable by manipulation by the thumb of the hand for indication of elevational translational movement of the simulated viewpoint in a direction perpendicular to the simulated plane;
   a second encoder for detecting movement of the second locating member and for producing output signals proportional to the detected movement of the second locating member and representative of the elevational translational movement along a third axis representative of the elevation in the direction perpendicular to the simulated plane, the third axis being orthogonal to the first set of said first and second mutually orthogonal axes.
   a third location member comprising a trackball supported by the chassis and located to be simultaneously manipulatable with said first locating member and said second locating member and mounted with a portion of the trackball projecting from a top of the housing in a location proximate two or more fingers of the hand in the grasping position for simultaneous rotation with respect to a second set of three mutually independent axes and spherically rotatably movable by the fingers of the hand of the user in simulation of arbitrary rotational movement of the simulated viewpoint in the simulated space;
   a third encoder for detecting movement of the third locating member and for producing output signals proportional to the detected movement of the third locating member and representative of the arbitrary rotational movement about the second set of three mutually orthogonal axes representative of the simulated space; and
   a controller for receiving the output signals from the first, second, and third encoders and for determining from the output signals from the encoders spatial positional data comprising three translational coordinates representative of the translational movement within and above and below the simulated plane ad three rotational coordinates representative of the arbitrary rotational movement in the simulated space and for transmitting signals representative of the determined spatial positional data in the simulated space to the host computer.

2. The hand manipulatable input device of claim 1 wherein the first encoder comprises:
   a first rotatable member mounted on the chassis to frictionally engage the roller ball along a first great circle course, and
   a second rotatable member mounted on the chassis to frictionally engage the roller ball along a second great circle course,
   the first and second great circle courses lying in mutually perpendicular planes.

3. The hand manipulatable input device of claim 2 wherein the first encoder further comprises an optical encoder associated with each of the first and second rotatable members, each optical encoder able to produce optical signals representative of the magnitude and direction of rotation of its associated rotatable member and to produce electrical signals in response to the detected optical signals.

4. The hand manipulatable input device of claim 1, wherein the second encoder comprises a rotatable member mounted on the chassis to frictionally engage the circumference of the thumbwheel.

5. The hand manipulatable input device of claim 4, wherein the second encoder further comprises an optical encoder associated with the rotatable member engaging the thumbwheel to produce optical signals representative of the magnitude and direction of rotation of the associated rotatable member and to produce electrical signals in response to the detected optical signals.

6. The hand manipulatable input device of claim 1, wherein the third encoder comprises:
   a first rotatable member mounted on the chassis to frictionally engage the trackball along a first trackball great circle course,
   a second rotatable member mounted on the chassis to frictionally engage the trackball along a second trackball great circle course, and
   a third rotatable member mounted on the chassis to frictionally engage the trackball along a third trackball great circle course,
   the first, second, and third trackball great circle courses lying in mutually perpendicular planes.

7. The hand manipulatable input device of claim 6, wherein the trackball is supported within the housing by the first, second, and third rotatable members.

8. The hand manipulatable input device of claim 6, wherein the first and second rotatable members are mounted within the housing to contact the trackball below the equator of the trackball and the third rotatable member is mounted within the housing to contact the trackball on the equator of the trackball.

9. The hand manipulatable input device of claim 6, wherein the trackball is supported within the housing entirely by the first, second, and third rotatable members.

10. The hand manipulatable input device of claim 6, wherein the third encoder comprises an optical encoder associated with each of the first, second, and third rotatable members, each optical encoder able to produce optical signals representative of the magnitude and direction of rotation of its associated rotatable member and to produce electrical signals in response to the detected optical signals.

11. The hand manipulatable input device of claim 1 wherein the controller further includes a serial data transmission port through which the spatial positional data is transmitted to the host computer.

* * * * *

UNITED STATES PATENT AND TRADEMARK OFFICE
CERTIFICATE OF CORRECTION

PATENT NO. : 5,298,919
DATED : March 29, 1994
INVENTOR(S) : Mingtai Chang

It is certified that error appears in the above-indentified patent and that said Letters Patent is hereby corrected as shown below:

On the cover page, in the line identified as [75], "Inventor: Mingtai Chang, Harvard, Mass." should read
--Inventors: Mingtai Chang, Harvard, Mass. and Timothy C. Jones, Westford, Mass.--.

Column 4, line 46, "$\phi$, $\theta$, and $\phi$" should read --$\phi$, $\theta$, and $\varphi$--.

Column 4, line 32/33, "$\phi$, $\theta$, and $\phi$" should read --$\phi$, $\theta$, and $\varphi$--.

Column 6, line 16, "$\phi$, $\theta$, and $\phi$" should read --$\phi$, $\theta$, and $\varphi$--.

Column 6, line 21, "passe through" should read --passes through--.

Column 6, line 25, "$\phi$, $\theta$, and $\phi$" should read --$\phi$, $\theta$, and $\varphi$--.

Column 6, line 37, "$\phi$ encoder 66" should read --$\varphi$ encoder 66--.

Column 6, line 53, "$\phi$ encoder" should read --$\varphi$ encoder--.

Column 7, line 57, "$\phi$, $\theta$, and $\phi$" should read --$\phi$, $\theta$, and $\varphi$--.

Column 8, line 23, "o the" should read --on the--.

Column 9, line 55, "openable" should read --operable--.

UNITED STATES PATENT AND TRADEMARK OFFICE
CERTIFICATE OF CORRECTION

PATENT NO. : 5,298,919
DATED : March 29, 1994
INVENTOR(S) : Mingtai Chang

It is certified that error appears in the above-indentified patent and that said Letters Patent is hereby corrected as shown below:

Column 12, line 7, "$\vec{V}_B\ \vec{V}_A + \vec{\Omega}\ X\ \vec{R}$" should read --$\vec{V}_B=\vec{V}_A + \vec{\Omega}\ X\ \vec{R}$--.

Column 12, line 17, "where.indicates" should read --where . indicates--.

Column 12, line 50, "stairway All" should read --stairway. All--.

Column 12, line 62, "housing which" should read --housing, which--.

Column 13, line 8, "stick vertical or Z axis" should read --stick may be limited or locked to a single axis, for example, the vertical or Z axis--.

Column 13, line 62, "location" should read --locating--.

Column 14, lnie 21, "ad" should read --and--.

Signed and Sealed this

Seventh Day of February, 1995

Attest:

BRUCE LEHMAN

Attesting Officer     Commissioner of Patents and Trademarks